United States Patent Office 3,125,584
Patented Mar. 17, 1964

3,125,584
CYANOFURANS
Claus D. Weis, Wilmington, Del., assignor to E. I. du Pont de Nemours and Company, Wilmington, Del., a corporation of Delaware
No Drawing. Filed Feb. 2, 1961, Ser. No. 86,597
7 Claims. (Cl. 260—346.1)

This invention relates to polycyano substituted cyclic compounds. More particularly it relates to dicyanofurans, to adducts of such furans, to addition products of such adducts, and to methods for making such compounds.

The dicyanofuran compounds of this invention are the 3,4-dicyanofurans represented by the formula (1) 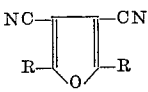

wherein the R groups are alike and are hydrogen, lower alkyl (i.e., 1–4 carbon atoms), carboxy, hydroxymethyl or chlorocarbonyl.

The adduct compounds of the invention are the dicyanoacetylene adducts of the compounds of Formula 1 above wherein the R groups are alike and are hydrogen or lower alkyl. In other words, the adducts are 2,3,5,6-tetracyano-7-oxabicyclo-[2,2,1]hepta - 2,5 - dienes represented by the formula

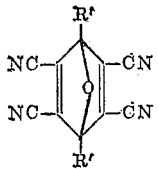

wherein the R' groups are alike and are hydrogen or lower alkyl (i.e., 1–4 carbon atoms).

Additional compounds of the invention are the triphenylphosphine addition products of the compounds of Formula 2 above. These addition products are meso-ionic compounds represented by the following resonance forms:

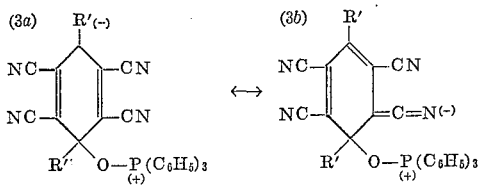

where the R' groups are as in the compounds of Formula 2.

A. 3,4-DICYANO-2,5-FURANDICARBOXYLIC ACID 3,4-dicyano-2,5-furandicarboxylic acid, a compound of the invention represented by Formula 1 wherein the R groups are carboxy, is prepared by the saponification of 3,4-dicyano-2,5-dicarbethoxyfuran. The saponification reaction is carried out using a strong inorganic base such as an alkali metal hydroxide, calcium hydroxide, barium hydroxide and the like as the saponification agent. The reagents are advantageously used in stoichiometric proportions, that is about two moles of hydroxide ion per mole of the dicyanofuran ester starting material. Preferably a water-ethanol mixture is used as the reaction medium, but this mixture is not essential and other media such as dioxane-water, tetrahydrofuran-water, or water alone can be used. The saponification yields the metal salt of the dicarboxylic acid, and the salt is readily converted to the acid by mixing with an acid of sufficient strength to displace the metal cation. Strong inorganic acids such as hydrochloric acid, sulfuric acid and the like are preferred. Organic acids of sufficient strength can also be used but are not preferred since their presence often complicates purification procedures, especially those involving extraction.

The saponification reaction and subsequent acidification reaction are conveniently carried out at room temperature; but, of course, lower or higher temperatures can be used limited only by the slow rate of reaction on the one hand or decomposition on the other.

*Example I*

3,4-dicyano-2,5-dicarbethoxyfuran (26 parts) is dispersed in a solution containing 9 parts of sodium hydroxide, 200 parts of water and 8 parts of ethanol. The mixture is stirred for 3 hours at room temperature, is filtered and is acidified with 31 parts of concentrated hydrochloric acid. The solution is then heated to 50° C. for 1 minute. Immediately the solution is cooled in ice and the cold solution is extracted with diethyl ether. The ether is evaporated from the extract and the residue is recrystallized from ethanol. The product 3,4-dicyano-2,5-furandicarboxylic acid is a colorless crystalline material which melts over the range 240–245° C. with decomposition to 3,4-dicyanofuran.

*Analysis.*—Calc. for $C_8H_2N_2O_5$: C=46.61%; H=0.98%; N=13.59%. Found: C=46.45%; H=1.05%; N=13.70%.

The 3,4-dicyano-2,5-dicarbethoxyfuran used as the starting material in the above preparation of the furandicarboxylic acid is prepared as follows:

Diethyl oxalate (160 parts) is stirred into a dispersion containing 52 parts of sodium hydride in 176 parts of benzene, and the mixture is warmed to 55° C. A solution of 40 parts of succinonitrile in 308 parts of benzene is added with stirring, but without further heating, over a three-hour period. The mixture is stirred an additional hour before the bright yellow precipitate of impure disodium diethyl-2,5-dioxo-3,4-dicyanoadipate is filtered and dried under vacuum. A solution containing 64.8 parts of this crude product, 213 parts of ether and 0.5 part of pyridine is prepared and a solution of 24 parts of thionyl chloride in 71 parts of ether is added over a fifteen-minute period. The mixture is refluxed for two hours. The mixture is filtered while warm and the filtrate is extracted twice with ether. The combined extracts are neutralized with aqueous sodium bicarbonate, washed with water and dried over sodium sulfate. Impure 3,4-dicyano-2,5-dicarbethoxyfuran is obtained by evaporation of the ether. The product is purified by recrystallization from ethanol.

3,4-dicyano-2,5-furandicarboxylic acid is useful as an intermediate in the preparation of a number of valuable products. For example, it is useful in preparing 1,2,4,5-tetracyanobenzene which is used in the production of phthalocyanine-pigment intermediates such as those described in U.S. Patent 2,727,043. In the preparation of the tetracyanobenzene, the dicarboxylic acid is first converted to 3,4-dicyanofuran as is illustrated by Example II hereinafter, the dicyanofuran is reacted with dicyanoacetylene to give 2,3,5,6-tetracyano-7-oxabicyclo[2,2,1]-hepta-2,5-diene as illustrated by Example VII hereinafter, and said heptadiene is reacted with triphenyl phosphine to give meso-ionic addition products as illustrated by Example VIII hereinafter, which addition product is then heated at 195° C. to convert it to 1,2,4,5-tetracyanobenzene.

3,4-dicyano-2,5-furandicarboxylic acid is also useful for reaction with polyols to give polyesters with modified properties associated with the presence of cyano substituents in the main polymer chain.

B. 3,4-DICYANOFURAN 3,4-dicyanofuran can be prepared by the decarboxylation of 3,4-dicyano-2,5-furandicarboxylic acid. It can also be prepared using 3,4-dicarbalkoxyfuran as the starting material by a method in which the dicarbalkoxyfuran is ammonolyzed to 3,4-dicarbamoylfuran which is then dehydrated to 3,4-dicyanofuran.

The decarboxylation of 3,4-dicyano-2,5-furandicarboxylic acid to give 3,4-dicyanofuran is conveniently carried out in the presence of a metal catalyst such as copper powder, iron filings, platinum, or the like. Under these conditions, gas evolution proceeds rapidly and smoothly when the temperature reaches about 150° C., and the decarboxylation is preferably carried out at about 160° C. The decarboxylation can be carried out without the aid of a metal catalyst but it proceeds rather slowly until the temperature of the dicarboxylic acid reaches about 240°–245° C. at which temperature, with or without the metal catalyst, the dicarboxylic acid decomposes and sublimation of the 3,4-dicyanofuran takes place.

Example II 3,4-dicyano-2,5-furandicarboxylic acid (2.5 parts) is mixed with 0.2 part of copper powder, and the mixture is heated to 160° C. Evolution of carbon dioxide occurs smoothly, and the 3,4-dicyanofuran sublimes to the cool part of the tube. Recrystallization of the sublimate from methanol affords a crystalline product melting over the range 159–160° C. The formula

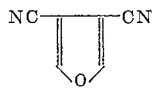

is indicated by elemental analyses and supported by infrared data.

*Analysis.*—Calc. for $C_6H_2N_2O$: C=61.05%; H=1.71%; N=23.70%. Found: C=60.70%; H=2.0%; N=23.40%.

In the preparation of 3,4-dicyanofuran from 3,4-dicarbalkoxyfuran, a carbalkoxy-substituted furan such as 3,4-dicarbethoxyfuran is ammonolyzed in ammoniacal aqueous methanol medium. Other ammonolysis procedures can be used, however. For example, the ammonolysis can be carried out in various media such as aqueous ammonia, anhydrous methanolic ammonia and the like. The time required for the ammonoylsis will vary, of course, with the choice of the reaction medium and the particular reactant. The ammonolysis can be carried out at or near atmospheric pressure. Alternatively, the reactants can be placed in a cold pressure vessel which is then sealed, and the reaction allowed to proceed at an appropriate temperature under autogenous pressure. Ammonolysis proceeds over a wide range of temperatures, and the choice of temperature is based principally on achieving a practical reaction rate. While various carbalkoxy derivatives of furan can be used as starting materials, great differences in reactivity are noted and reaction conditions must be modified accordingly.

The carbamoyl derivatives resulting from the ammonolysis are readily converted to the 3,4-dicyanofuran by dehydration. Phosphorus oxychloride is a suitable dehydrating agent. The amount of phosphorus oxychloride used is not critical. Stoichiometric quantities of the oxychloride, i.e. one mole per carbamoyl group can be used. Alternatively, large excesses of the oxychloride can be used, in which case it serves both as a dehydrating agent and as an active solvent for the product. After the reaction has progressed to completion, the excess reagent can be removed by distillation under vacuum or it can be decomposed by water. The dehydration takes place at slightly elevated temperatures, and although the reaction is somewhat exothermic, it is usually desirable to apply external heat. Preferred reaction temperatures are within the range 50–110° C., reflux temperatures being especially convenient. But higher and lower temperatures are operable, care being taken, of course, to avoid decomposition temperatures of product and/or reactants.

Example III 3,4-dicarbethoxyfuran (20 parts), 45 parts of aqueous ammonia and 8 parts of methyl alcohol are heated in a sealed vessel at about 100° C. for four hours. Upon cooling 3,4-dicarbamoylfuran crystallizes from the reaction mixture. The crystals are removed from the vessel, washed with ice water, decolorized with charcoal and recrystallized from boiling water. After drying at 55° C. under vacuum, the crystals melt at 270–275° C. Elemental and infrared analyses support the structure

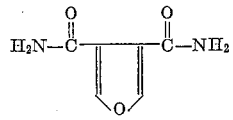

*Analysis.*—Calc. for $C_6H_6N_2O_3$: C=46.76%; H=3.92%; N=18.18%. Found: C=47.01%; H=4.01%; N=18.26%.

The 3,4-dicarbethoxyfuran used in making the 3,4-dicarbamoylfuran, as described above, is prepared according to the method described by Kornfeld and Jones in J. Org. Chem. 19, 1674 (1954), except that sodium hydride is substituted for the sodium metal of that method.

3,4-dicarbamoylfuran (30 parts), prepared as above, is suspended in 250 parts of phosphorus oxychloride and the mixture is refluxed for 1 hour. Excess phosphorus oxychloride is decomposed by the addition of ice, and the mixture is filtered to recover crystalline 3,4-dicyanofuran. Additional 3,4-dicyanofuran is obtained from ether extracts of the filtrate by evaporation of the ether. The combined product is recrystallized from boiling water. The purified material does not depress the melting point of 3,4-dicyanofuran prepared as in Example II, and the infrared spectra of the products of Example II and III are identical.

3,4-dicyanofuran is useful in the preparation of 1,2,4,5-tetracyanobenzene, a valuable compound for the preparation of phthalocyanine-pigment intermediates such as those described in U.S. Patent 2,727,043. Said tetracyanobenzene can be prepared by reacting the 3,4-dicyanofuran with dicyanoacetylene to give 2,3,5,6-tetracyano-7-oxabicyclo-[2,2,1]hepta-2,5-diene as illustrated by Example VII which adduct is then reacted with triphenylphosphine to give meso-ionic addition products of Formula 3 above as illustrated by Example VIII and these addition products are heated to about 195° C. until their blue color disappears and there is thereby obtained 1,2,4,5-tetracyanobenzene.

C. 3,4-DICYANO-2,5-DIALKYLFURAN 3,4-dicyano-2,5-dialkylfurans are conveniently prepared by ammonolysis of a 3,4-dicarboalkoxy-2,5-dialkyl furan to 3,4-dicarbamoyl-2,5-dialkylfuran, which compound is then dehydrated to 3,4-dicyano-2,5-dialkylfuran. The ammonolysis is conveniently carried out in an ammoniacal aqueous methanol medium but other media such as aqueous ammonia, anhydrous methanolic ammonia and the like can be used, if desired. The ammonolysis can be carried out at or near atmospheric pressure or alternatively the reactants can be placed in a cold pressure vessel which is then sealed and the reaction allowed to proceed at an appropriate temperature under autogenous pressure. The reaction proceeds over a wide range of temperatures, and the choice of temperature is based principally on achieving a practical reaction rate. The reactivity of the various 3,4-dicarbalkoxy-2,5-dialkylfuran starting materials varies greatly and reaction conditions must be varied accordingly to obtain suitable reaction times.

The carbamoyl derivatives are readily converted to the cyano compounds by dehydration. Phosphorus oxychloride is a suitable dehydrating agent. The amount of phosphorus oxychloride used is not critical. Stoichiometric quantities of the oxychloride, i.e., one mole per carbamoyl group can be used. Alternatively, large excesses of the oxychloride can be used, in which case it serves both as a dehydrating agent and as an active solvent for the product. After the reaction has progressed to completion, the excess reagent can be removed by distillation under vacuum or it can be decomposed by water. The dehydration takes place at slightly elevated temperatures, and although the reaction is somewhat exothermic, it is usually desirable to apply external heat. Preferred reaction temperatures are within the range 50–110° C., reflux temperatures being especially convenient. But higher and lower temperatures are operable, care being taken, of course, to avoid decomposition temperatures of product and/or reactants.

*Example IV*

A mixture containing 42 parts of 2,5-dimethyl-3,4-dicarbomethoxyfuran, 50 parts of aqueous ammonia and 16 parts of methanol saturated with gaseous ammonia is heated in a sealed vessel at about 100° C. for sixteen hours. The contents of the vessel are then cooled, the vessel is opened, and the contents evaporated to dryness. The residue is washed with hot water and purified by recrystallization. Analyses of the recrystallized product established it to be 3,4-dicarbamoyl-2,5-dimethylfuran. It melts over the range 254–256° C.

*Analysis.*—Calc. for $C_8H_{10}N_2O_3$: C=52.76%; H=5.54%; N=15.38%. Found: C=52.49%; H=5.62%; N=14.99%.

The 2,5-dimethyl-3,4-dicarbomethoxyfuran employed as a starting material in making the above described carbamoyl compound is made by a series of reactions: Ethyl acetoacetate (260 parts) is added slowly to 48 parts of sodium in 2100 parts of anhydrous ether. The mixture is then shaken with 210 parts of iodine dissolved in dry ether. After standing for 1 hour, the mass is filtered, and upon evaporation of the filtrate, crystals of diethyl diacetylsuccinate precipitate. This product is recrystallized from 50% acetic acid and dried. The diethyl diacetylsuccinate (52 parts) is suspended in 460 parts of concentrated sulfuric acid and the mixture is heated for 20 minutes at 50–55° C. After cooling in ice, the mixture is poured over ice and allowed to stand for 30 minutes. The mixture is extracted with three 150 part portions of ether and the extracts are dried over sodium sulfate. 2,5-dimethyl-3,4-dicarbethoxyfuran is obtained from the extract by distillation under vacuum (2 mm. of Hg), collecting the fraction boiling between 108–117° C.

A cooled solution of 12.5 parts of potassium hydroxide in 15 parts of water is then added to 24 parts of the 2,5-dimethyl-3,4-dicarbethoxyfuran in 40 parts of ethanol, and the mixture is refluxed for 1 hour. The ethanol is evaporated, 30 parts of water is added and the mixture is acidified with 12 parts of concentrated sulfuric acid, the temperature being maintained by cooling in ice. The crystalline product of 2,5-dimethyl-3,4-furandicarboxylic acid is filtered, recrystallized from boiling water, and dried with phosphorus pentoxide over boiling methanol (M.P. 231–236° C.) To 41 parts of this acid is added a solution of diazomethane in absolute ether in sufficient quantity to give a permanent yellow color. The mixture is then allowed to stand overnight. Then formic acid is added until the yellow color disappears. The mixture is filtered, the ether is removed from the filtrate, and the residue is distilled under vacuum at 1 mm. of Hg. The 2,5-dimethyl-3,4-dicarbomethoxyfuran ester is collected over the temperature range 105–108° C.

2,5-dimethyl-3,4-dicarbamoylfuran (10 parts), prepared as described above in this example, is suspended in 84 parts of phosphorus oxychloride and the mixture is refluxed for 8 minutes. After cooling, the mixture is poured over ice and 2,5-dimethyl-3,4-dicyanofuran separates as a crystalline product. Additional product is obtained from ether extracts of the filtrate. The fractions are combined and recrystallized from carbon tetrachloride. The colorless product melts over the range 92–93.5° C. Elemental and infrared analyses establish that the composition is 2,5-dimethyl-3,4-dicyanofuran, which product is represented by the formula

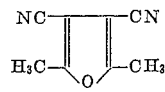

*Analysis.*—Calc. for $C_8H_6N_2O$: C=65.78%; H=4.11%; N=19.18%. Found: C=65.68%; H=4.15%; N=18.88%.

The 3,4-dicyanodialkylfuran are useful in making adducts with dicyanoacetylene as illustrated in Example VII, which adducts are useful as described in said Example VII in the preparation of 1,2,4,5-tetracyano-3,6-dialkylbenzenes, compounds useful in making phthalocyanine-pigment intermediate.

D. 3,4-DICYANO-2,5-FURANDICARBONYL CHLORIDE 3,4-dicyano-2,5-furandicarbonyl chloride is made by reaction of 3,4-dicyano-2,5-furandicarboxylic acid with thionyl chloride, phosphorus pentachloride, phosphorus trichloride or the like. The reaction with phosphorus pentachloride is especially suitable and hence is preferred. No solvent is required but inert diluents such as benzene can be employed, if desired. Reaction temperatures in the range of 25–100° C. are preferred using phosphorus pentachloride.

*Example V*

Finely powdered 3,4-dicyano-2,5-furandicarboxylic acid (10 parts) is mixed with 22 parts of phosphorus pentachloride, and the mixture is heated to about 40° C. The mixture slowly solidifies, and the temperature is increased to 70–85° C. where it is kept until all the acid dissolves. The mixture is filtered and the filtrate is added to a large excess of petroleum ether. An oil separates which soon crystallizes. The crystals are filtered and washed with petroleum ether. The excess phosphorus pentachloride is removed under vacuum at 30–40° C. Recrystallization of the product from chloroform yields white crystals of 3,4-dicyano-2,5-furandicarbonyl chloride, melting at 124–125° C. The product is identified through its ester derivative, 3,4-dicyano-2,5-dicarbethoxyfuran, which does not depress the melting point of an authentic sample of the ester; and the infrared spectra of the two ester samples are identical.

3,4-dicyano-2,5-furandicarbonyl chloride is useful in the preparation of 3,4-dicyano-2,5-bis(hydroxymethyl)furan, as illustrated in Example VI, which hydroxymethyl compound is useful for reaction with polycarboxylic acids to make polyester polymers having modified properties associated with the presence of cyano substituents on the main polymer chain.

E. 3,4-DICYANO-2,5-BIS(HYDROXYMETHYL)-FURAN 3,4-dicyano-2,5-bis(hydroxymethyl)furan is prepared by the reduction of 3,4-dicyano-2,5-furandicarbonyl chloride. The reduction is carried out with lithium aluminum hydride-tri-tertiary butoxide as a reducing agent. Other reducing agents such as lithium, sodium, or potassium borohydride or sodium trimethoxyborohydride are operable for the reduction, but decomposition of the boron complex thus formed and complete removal of the boron from the final product is somewhat cumbersome. Therefore, lithium aluminum hydride-tri-tertiary butoxide is preferred. Reducing agents are chosen for their ability to reduce the acid chloride groups while leaving the cyano groups intact. The reduction is preferably carried out in the temperature of —25 to 0° C. Both higher and lower temperatures can be employed, however, limitations being imposed only by reaction rate or reduction beyond the desired product.

*Example VI*

An ice-cold solution of 10 parts of 3,4-dicyano-2,5-furandicarbonyl chloride, prepared as in Example V, in 43 parts of ethylene glycol dimethyl ether is slowly added to 60 parts of lithium aluminum hydride-tri-tertiary butoxide in 86 parts of the same solvent. The temperature is kept at 0° C. during the reaction, and stirring is continued for four hours after the addition is complete. The excess reducing agent is decomposed with ice-water. The mixture is filtered and the filter-cake is extracted several times with diethyl ether. The filtrate and extracts are combined and concentrated on a steambath. The residue is dissolved in a small amount of water and extracted with ether. Upon evaporation of the ether and recrystallization of the residue from ethyl acetate, colorless crystals are obtained which melt over the range 99–100.5° C. and which are identified by elemental and infrared analysis as 3,4-dicyano-2,5-bis(hydroxymethyl)furan.

*Analysis.*—Calc. for $C_8H_6N_2O_3$: C=53.93%; H=3.39%; N=15.72%. Found: C=53.75%; H=3.36%; N=15.77%.

The bis(hydroxymethyl)furan compound of this example is useful in preparing polymeric materials when reacted with polycarboxylic acids. The resulting polyesters have the modified properties associated with the presence of cyano substituents on the main polymer chain.

F. 2,3,5,6-TETRACYANO-7-OXABICYCLO-[2,2,1]HEPTA-2,5-DIENES

The 2,3,5,6 - tetracyano-7-oxabicyclo-[2,2,1]hepta-2,5-dienes are the dicyanoacetylene adducts of dicyanofuran and of the 2,5-di(lower alkyl) dicyanofuran. The preparation of such compounds is illustrated by the following example.

*Example VII*

A mixture of 2.36 parts of 3,4-dicyanofuran and 2 parts of dicyanoacetylene is heated in a sealed vessel in refluxing bromobenzene (156° C.) for 18 hours. The vessel is then cooled and the crystalline product is removed and extracted with boiling ethanol. The residue is sublimed through a thin layer of glass wool at 180° C. A white crystalline product is obtained which melts over the range 325–330° C. Chemical analyses and infrared data established the product as the above-mentioned oxabicyclo compound, represented by the formula

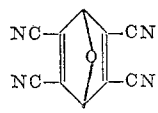

*Analysis.*—Calc. for $C_{10}H_2N_4O$: C=61.81%; H=1.04%; N=28.86%. Found: C=61.75%; H=1.09%; N=28.72%.

The dimethyl derivative having the structure

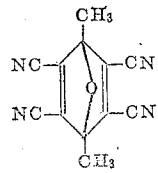

is prepared by following the identical procedure given in the preceding paragraph of this example except that 3,4-dicyano-2,5-dimethylfuran is substituted for 3,4-dicyanofuran.

The 2,3,5,6 - tetracyano-7-oxabicyclo-[2,2,1]hepta-2,5-dienes are useful in preparing addition products with triphenylphosphine as illustrated by Example VIII, which addition products are useful in the preparation of 1,2,4,5-tetracyanobenzenes, compounds valuable in the production of phthalocyanine-pigment intermediate.

G. TRIPHENYLPHOSPHINE ADDITION PRODUCTS OF 2,3,5,6-TETRACYANO-7-OXABICYCLO-[2,2,1]HEPTA-2,5-DIENE

The triphenylphosphine addition products of 2,3,5,6-tetracyano-7-oxabicyclo-[2,2,1]hepta-2,5-diene and 1,4-dialkyl - 2,3,5,6 - tetracyano - 7 - oxabicyclo - [2,2,1] - hepta-2,5-diene are prepared by refluxing triphenylphosphine with the bicycloheptadiene reactant in acetonitrile. the products are dark blue solids. The following example illustrates:

*Example VIII*

2,3,5,6 - tetracyano-7-oxabicyclo-[2,2,1]hepta-2,5-diene (0.48 part), prepared as in Example VII, 0.7 part of triphenylphosphine and 7.8 parts of acetonitrile are refluxed together for two minutes. After cooling to room temperature, the mixture is chilled in ice and a dark blue precipitate separates. The precipitate is filtered and washed with cold diethyl ether. Analysis establishes the addition product to have the empirical formula $C_{28}H_{17}N_4OP$.

*Analysis.*—Calc. for $C_{28}H_{17}N_4OP$: C=73.67%; H=3.75%; N=12.28%; P=6.79%. Found: C=73.49%; H=3.85%; N=12.65%; P=6.79%.

Available technical evidence indicates that the addition products such as the product of this example are mesoionic compounds whose structures are represented by the resonant forms:

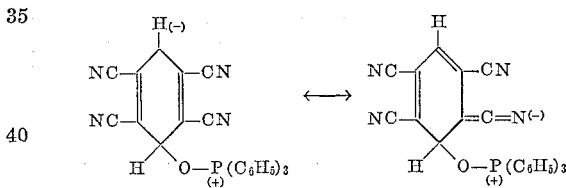

The triphenylphosphine addition products referred to above are easily converted to 1,2,4,5-tetracyanobenzenes by heating. For instance, the product of Example VIII is heated to 195° C. until its blue color disappears. The reaction mass then solidifies upon cooling. The solid is extracted with boiling ethanol, and the extract is chilled in ice. Crystals which separate are identified as 1,2,4,5-tetracyanobenzene by comparison with an authentic sample of the compound prepared by a conventional route. 1,2,4,5-tetracyano - 3,6 - dimethylbenzene and analogous lower dialkyl benzenes are prepared in like manner. The tetracyanobenzenes are useful in the production of phthalocyanine-pigment intermediates such as those described in U.S. Patent 2,727,043.

I claim:

1. A 3,4-dicyanofuran represented by the formula

wherein the R groups are alike and are from the class consisting of hydrogen, 1-4 carbon alkyl, carboxy, hydroxymethyl and chlorocarbonyl.

2. 3,4-dicyanofuran.

3. 3,4-dicyano-2,5-furandicarboxylic acid.

4. 3,4-dicyano-2,5-di(1–4 carbon alkyl)furan.

5. The composition of claim 4 wherein the lower alkyl radical is methyl.

6. 3,4-dicyano-2,5-bis(hydroxymethyl)furan.

7. 3,4-dicyano-2,5-furandicarbonyl chloride.

(References on following page)

References Cited in the file of this patent

UNITED STATES PATENTS

| | | |
|---|---|---|
| 2,781,393 | Heckert et al. | Feb. 12, 1957 |
| 2,846,449 | Banford et al. | Aug. 5, 1958 |
| 2,928,865 | Brasen | Mar. 15, 1960 |
| 2,980,704 | Gever | Apr. 18, 1961 |

FOREIGN PATENTS

| | | |
|---|---|---|
| 912,334 | Germany | May 28, 1954 |

OTHER REFERENCES

Degering: An Outline of Nitrogen Compounds (1950), page 504.

Dunlop: Furans (1953), pages 492–3, 527 and 544.

Ferguson: Organic Chemistry (1958), page 249.